(12) United States Patent
Usuda et al.

(10) Patent No.: US 8,359,043 B2
(45) Date of Patent: Jan. 22, 2013

(54) TRANSMISSION SPEED CONTROL METHOD, MOBILE STATION, AND RADIO LINE CONTROL STATION

(75) Inventors: Masafumi Usuda, Tokyo (JP); Anil Umesh, Yokohama (JP); Takehiro Nakamura, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 415 days.

(21) Appl. No.: 11/794,977

(22) PCT Filed: Jan. 11, 2006

(86) PCT No.: PCT/JP2006/300228
§ 371 (c)(1),
(2), (4) Date: Oct. 1, 2007

(87) PCT Pub. No.: WO2006/075629
PCT Pub. Date: Jul. 20, 2006

(65) Prior Publication Data
US 2008/0207216 A1    Aug. 28, 2008

(30) Foreign Application Priority Data
Jan. 11, 2005    (JP) ................................. 2005-004588

(51) Int. Cl.
*H04W 72/00* (2009.01)
(52) U.S. Cl. ............... 455/453; 455/450; 455/422.1; 455/436; 370/338; 370/331; 370/431; 370/232
(58) Field of Classification Search ............... 370/232, 370/310, 328, 229, 331, 338, 340, 341, 431; 455/450–453, 422.1, 455, 502, 509, 464, 455/442–444, 436–439
See application file for complete search history.

(56) References Cited

U.S. PATENT DOCUMENTS
2002/0196752 A1*    12/2002    Attar et al. .................... 370/331
(Continued)

FOREIGN PATENT DOCUMENTS
EP    1 453 225 A1    9/2004
JP    2002-238074 A    8/2002
(Continued)

OTHER PUBLICATIONS

NTT Docomo, "Autonomous Rate Ramping for Common Rate Control," 3GPP TSG-RAN Working Group 2 #44, R2(04)2248, Sophia Antipolis, France, Oct. 4-8, 2004, XP-002482886, pp. 1-8.
(Continued)

*Primary Examiner* — Chuong A Ngo
(74) *Attorney, Agent, or Firm* — Marvin A. Motsenbocker; Mots Law, PLLC

(57) ABSTRACT

The present invention relates to a transmission rate control method for controlling a transmission rate of user data to be transmitted via an uplink by a mobile station. A radio network controller notifies an initial maximum allowable transmission rate of the user data to the mobile station, when a serving cell of the mobile station is to be changed. The mobile station increases the transmission rate of the user data up to the initial maximum allowable transmission rate notified from the radio network controller automatically, while the serving cell is being changed. The mobile station increases the transmission rate of the user data up to a maximum allowable transmission rate in the changed serving cell of the mobile station automatically, after the serving cell has been changed.

6 Claims, 8 Drawing Sheets

U.S. PATENT DOCUMENTS

| | | | |
|---|---|---|---|
| 2003/0171118 A1* | 9/2003 | Miya | 455/442 |
| 2003/0219037 A1 | 11/2003 | Toskala et al. | |
| 2004/0160914 A1* | 8/2004 | Sarkar | 370/329 |
| 2004/0219920 A1* | 11/2004 | Love et al. | 455/442 |
| 2005/0030964 A1* | 2/2005 | Tiedemann et al. | 370/431 |
| 2005/0037771 A1* | 2/2005 | Tiedemann et al. | 455/453 |
| 2005/0041618 A1* | 2/2005 | Wei et al. | 370/328 |
| 2005/0220052 A1* | 10/2005 | Uehara et al. | 370/331 |
| 2010/0014423 A1* | 1/2010 | Furuskar et al. | 370/235 |

FOREIGN PATENT DOCUMENTS

| | | |
|---|---|---|
| JP | 2003-111134 A | 4/2003 |
| JP | 2004-214914 A | 7/2004 |
| WO | WO 03/049327 A1 | 6/2003 |

OTHER PUBLICATIONS

NTT Docomo, "Cell level rate control and Autonomous transmission with rate ramping", 3GPP TSG-RAN Working Group 1 # Release-6 AdHoc Meeting, TSGR1(04)0773, Cannes, France, Jun. 21-24, 2004, XP008087242, 5 pages.

3GPP TSG-RAN Working Group 1 # Release-6 AdHoc Meeting TSGR1(04)0773, Cannes, France, Jun. 21-24, 2004, Source: NTT DoCoMo; Title: Cell level rate control and Autonomous transmission with rate ramping; Agenda item: 5, 6.3; Document for: Discussion.

The Indian office action issued on Sep. 26, 2011 in the counterpart Indian patent application.

* cited by examiner

TRANSMISSION SPEED CONTROL METHOD, MOBILE STATION, AND RADIO LINE CONTROL STATION

TECHNICAL FIELD

The present invention relates to a transmission rate control method, a mobile station and a radio network controller which control a transmission rate of user data to be transmitted via an uplink by a mobile station.

BACKGROUND ART

In a conventional mobile communication system, in an uplink from a mobile station UE to a radio base station Node B, a radio network controller RNC is configured to determine a transmission rate of a dedicated channel, in consideration of radio resources of the radio base station NodeB, an interference volume in an uplink, transmission power of the mobile station UE, transmission processing performance of the mobile station UE, a transmission rate required for an upper application, and the like, and to notify the determined transmission rate of the dedicated channel by a message of a layer-3 (Radio Resource Control Layer) to both of the mobile station UE and the radio base station Node B.

Here, the radio network controller RNC is provided at an upper level of the radio base station Node B, and is an apparatus configured to control the radio base station Node B and the mobile station UE.

In general, data communications often cause burst traffic compared with voice communications or TV communications. Therefore, it is preferable that a transmission rate of a channel used for the data communications is changed fast.

However, as shown in FIG. 1, the radio network controller RNC integrally controls a plurality of radio base stations Node B in general. Therefore, in the conventional mobile communication system, there has been a problem that it is difficult to perform fast control for changing of the transmission rate of channel (for example, per approximately 1 through 100 ms), due to processing load, processing delay, or the like.

In addition, in the conventional mobile communication system, there has been also a problem that costs for implementing an apparatus and for operating a network are substantially increased even if the fast control for changing of the transmission rate of the channel can be performed.

Therefore, in the conventional mobile communication system, control for changing of the transmission rate of the channel is generally performed on the order from a few hundred ms to a few seconds.

Accordingly, in the conventional mobile communication system, when burst data transmission is performed as shown in FIG. 2(a), the data are transmitted by accepting low-speed, high-delay, and low-transmission efficiency as shown in FIG. 2(b), or, as shown in FIG. 2(c), by reserving radio resources for high-speed communications to accept that radio bandwidth resources in an unoccupied state and hardware resources in the radio base station Node B are wasted.

It should be noted that both of the above-described radio bandwidth resources and hardware resources are applied to the vertical radio resources in FIGS. 2(a) and 2(c).

Therefore, the 3rd Generation Partnership Project (3GPP) and the 3rd Generation Partnership Project 2 (3GPP2), which are international standardization organizations of the third generation mobile communication system, have discussed a method for controlling radio resources at high speed in a layer-1 and a media access control (MAC) sub-layer (a layer-2) between the radio base station Node B and the mobile station UE, so as to utilize the radio resources effectively. Such discussions or discussed functions will be hereinafter referred to as "Enhanced Uplink (EUL)".

Radio resource control methods that have been discussed in the "Enhanced Uplink" can be broadly categorized into three as follows. The radio resource control methods will be briefly described below.

First, a radio resource control method that is referred to as "Time & Rate Control" has been discussed.

In such a radio resource control method, a radio base station Node B determines a mobile station UE which can transmit user data and a transmission rate of user data of the mobile station UE per a predetermined timing, so as to signal information relating to a mobile station ID as well as the transmission rate of user data (or a maximum allowable transmission rate of user data).

The mobile station UE that is designated by the radio base station Node B transmits user data at the designated timing and the transmission rate (or within a range of the maximum allowable transmission rate).

Second, a radio resource control method that is referred to as "Rate Control per UE" has been discussed.

In such a radio resource control method, if there is user data that should be transmitted to the radio base station Node B, each mobile station UE can transmit the user data. However, the maximum allowable transmission rate of the user data, which is determined by the radio base station Node B and signaled to each mobile station UE for each transmission frame or each of a plurality of transmission frames, is used.

Here, when the maximum allowable transmission rate is signaled, the radio base station Node B signals the maximum allowable transmission rate itself, or a relative value thereof (for example, binary of an "Up command" and a "Down command"), at this timing.

Third, a radio resource control method that is referred to as "Rate Control per Cell" has been discussed.

In such a radio resource control method, a radio base station Node B signals a transmission rate of user data, which is common among mobile stations UE in communication, or information needed to calculate the transmission rate, and each mobile station UE determines a transmission rate of user data based on the received information.

Ideally, the "Time & Rate Control", and the "Rate Control per UE" can be the best control methods for improving radio capacity in an uplink. However, a transmission rate of user data has to be granted after data volume stored in buffers of the mobile station UE, transmission power in the mobile station UE, or the like are grasped. Therefore, there has been a problem that control load is increased by the radio base station Node B.

In addition, in these radio resource control methods, there has been a problem that overhead becomes larger by exchanges of control signals.

On the other hand, in the "Rate Control per Cell", there is an advantage in that control load by the radio base station Node B is small since the radio base station Node B signals information which is common in cells, and each mobile station UE autonomously seeks the transmission rate of user data based on the received information.

However, the radio base station Node B has to be configured in such a manner that the user data in the uplink from any mobile station UE can be received. Therefore, there has been a problem that an apparatus size of radio base station Node B becomes large to effectively utilize the radio capacity of the uplink.

Accordingly, there has been proposed, for example, a scheme (Autonomous ramping method) that the mobile station UE increases the transmission rate of user data from a pre-notified initial transmission rate in accordance with pre-determined rules so that excessive allocation of radio capacity by the radio base station Node B can be prevented, thereby preventing increase of the apparatus size of radio base station Node B, as described in Non-patent Document 1.

In such a scheme, a radio base station Node B determines a maximum allowable transmission rate based on hardware resources and radio bandwidth resources (for example, an interference volume in an uplink) in each sector, so as to control the transmission rate of user data in communicating mobile stations UE. Detailed descriptions of a control scheme based on hardware resources and a control scheme based on an interference volume in an uplink will be given below.

In the control scheme based on the hardware resources, a radio base station Node B is configured to signal a maximum allowable transmission rate to a mobile station UE connected to a sector under the control thereof.

The radio base station Node B lowers the maximum allowable transmission rate so as to avoid shortage of the hardware resources when the transmission rate of user data in the mobile station UE connected to the sector under the control thereof is increased and the hardware resources are insufficient.

On the other hand, the radio base station Node B again increases the maximum allowable transmission rate when the space of the hardware resources become larger at a time of completion of user data transmission in the mobile station UE connected to the sector under the control thereof, or the like.

In addition, in the control scheme based on the interference volume in the uplink, a radio base station Node B is configured to signal a maximum allowable transmission rate to a mobile station UE connected to a sector under the control thereof.

When the transmission rate of user data in the mobile station UE connected to the sector under the control of a radio base station Node B increases and a measured interference volume (for example, a measured noise rise) in the uplink exceeds an allowable value (for example, a maximum allowable noise rise), the radio base station Node B lowers the maximum allowable transmission rate so that the interference volume in the uplink can be within a range of the allowable value (see, FIG. 3).

On the other hand, when the interference volume (for example, the noise rise) in the uplink is within a range of the allowable value (for example, the maximum allowable noise rise), thereby having a space, at the time of completion of user data transmission in the mobile station UE connected to the sector under the control of the radio base station Node B, or the like, the radio base station Node B again increases the maximum allowable transmission rate (see, FIG. 3).

As for the enhanced uplink, there exists a concept of a serving cell (or a serving cell set). FIG. 4 shows an example of a channel connection configuration in the mobile communication system to which enhanced uplink is applied.

Here, in terms of the enhanced uplink, a channel for transmitting user data by using the HARQ processing or the scheduling processing is defined as an Enhanced Dedicated Physical Channel (E-DPCH). A channel for transmitting uplink user data is defined as an Enhanced Dedicated Physical Data Channel (E-DPDCH), and a channel for transmitting uplink control data is defined as an Enhanced Dedicated Physical Control Channel (E-DPCCH).

In the mobile communication system, not only the E-DPCH but also a conventional Dedicated Physical Channel (DPCH) is also transmitted. It is assumed that control information on a layer 3 between the core network and the mobile station UE is transmitted on the DPCH.

In addition, in the mobile communication system, an Absolute Grant Channel (AGCH) transmits the maximum allowable transmission rate of the uplink user data.

The mobile station UE always receives the absolute grant channel (AGCH) that is always transmitted from only one cell. Here, a cell transmitting the AGCH that the mobile station UE should receive is called a "serving cell" of the mobile station UE, and cells belonging to the same radio base station NodeB as the serving cell are called a "serving cell set" of the mobile station UE.

Since the serving cell controls the transmission rate of the uplink user data in the mobile station UE, the radio network controller RNC generally takes control such that a cell having the strongest electric field strength in downlink or uplink would become a serving cell. Here, it is called "serving cell change" that a serving cell of a mobile station is changed.

In the conventional mobile communication system, when resources suitable for the transmission rate of user data transmitted from the mobile station UE which performs the cell change are not allocated to a destination cell in the cell change, the cell change is not performed smoothly.

Accordingly, in such case, the destination cell lowers the signaled maximum allowable transmission rate to have some margin in the resources, and the resources are secured for the mobile station UE. However, there is a problem that all the user data that have been transmitted by that time may be received as errors.

More specifically, in the conventional mobile communication system, there is a problem that significant deterioration in communication quality may occur, since the radio base station NodeB including the destination cell in the cell change cannot allocate the resources to the mobile station in which the cell change is to be performed.

(Non-patent Document 1) 3GPP TSG-RAN R1-040773

DISCLOSURE OF THE INVENTION

The present invention has been made considering the problems, and its object is to provide a transmission rate control method, a mobile station and a radio network controller which can prevent significant deterioration in communication quality attributable to the shortage of resource allocation in a destination cell, even when cell change is performed.

A first aspect of the present invention is summarized as a transmission rate control method for controlling a transmission rate of user data to be transmitted via an uplink by a mobile station, the method comprising the steps of: notifying, at a radio network controller, an initial maximum allowable transmission rate of the user data to the mobile station, when a serving cell of the mobile station is to be changed; increasing, at the mobile station, the transmission rate of the user data up to the initial maximum allowable transmission rate notified from the radio network controller automatically, while the serving cell is being changed; and increasing, at the mobile station, the transmission rate of the user data up to a maximum allowable transmission rate in the changed serving cell of the mobile station automatically, after the serving cell has been changed.

In the first aspect of the present invention, a transmission rate control method may comprise the step of: signaling, at the changed serving cell of the mobile station, the maximum allowable transmission rate in the changed serving cell of the mobile station to the mobile station; and the mobile station may increase the transmission rate of the user data up to the signaled maximum allowable transmission rate automatically, after the serving cell has been changed.

In the first aspect of the present invention, the radio network controller may notify the maximum allowable transmission rate in the changed serving cell of the mobile station to the mobile station, with using a layer-3 message; and the mobile station may increase the transmission rate of the user data up to the notified maximum allowable transmission rate automatically, after the serving cell has been changed.

A second aspect of the present invention is summarized as a mobile station which transmits user data via an uplink, comprising: an initial maximum allowable transmission rate receiving unit configured to receive an initial maximum allowable transmission rate of the user data notified by a radio network controller, when a serving cell of the mobile station is to be changed; and a transmission rate control unit configured to increase a transmission rate of the user data up to the initial maximum allowable transmission rate notified from the radio network controller automatically, while the serving cell is being changed; and to increase the transmission rate of the user data up to a maximum allowable transmission rate in the changed serving cell of the mobile station automatically, after the serving cell has been changed.

In the second aspect of the present invention, the mobile station may comprise a maximum allowable transmission rate receiving unit configured to receive the maximum allowable transmission rate in the changed serving cell of the mobile station signaled by the changed serving cell of the mobile station; and the transmission rate control unit may be configured to increase the transmission rate of the user data up to the received maximum allowable transmission rate automatically.

In the second aspect of the present invention, the mobile station may comprise a maximum allowable transmission rate receiving unit configured to receive the maximum allowable transmission rate in the changed serving cell of the mobile station notified by the radio network controller; and the transmission rate control unit may be configured to increase the transmission rate of the user data up to the received maximum allowable transmission rate automatically.

A third aspect of the present invention is summarized as a radio network controller which controls a transmission rate of user data to be transmitted via an uplink by a mobile station, comprising: an initial maximum allowable transmission rate notifying unit configured to notify an initial maximum allowable transmission rate of the user data to the mobile station, when a serving cell of the mobile station is to be changed.

In the third aspect of the present invention, the radio network controller may comprise a maximum allowable transmission rate configured to notify the maximum allowable transmission rate in the changed serving cell of the mobile station to the mobile station, with using a layer-3 message, after the serving cell has been changed.

A fourth aspect of the present invention is summarized as a transmission rate control method for controlling a transmission rate of user data to be transmitted via an uplink by a mobile station, the method comprising the steps of: notifying, at a radio network controller, an initial maximum allowable transmission rate of the user data to the mobile station, when a serving cell of the mobile station is to be changed; determining, at the mobile station, the transmission rate of the user data based on the initial maximum allowable transmission rate notified from the radio network controller, while the serving cell is being changed; and determining, at the mobile station, the transmission rate of the user data based on a maximum allowable transmission rate in the changed serving cell of the mobile station, after the serving cell has been changed.

In the fourth aspect of the present invention, a transmission rate control method may comprise the step of: signaling, at the changed serving cell of the mobile station, the maximum allowable transmission rate in the changed serving cell of the mobile station to the mobile station; and the mobile station may determine the transmission rate of the user data based on the signaled maximum allowable transmission rate, after the serving cell has been changed.

In the fourth aspect of the present invention, the radio network controller may notify the maximum allowable transmission rate in the changed serving cell of the mobile station to the mobile station, with using a layer-3 message; and the mobile station may determine the transmission rate of the user data based on the notified maximum allowable transmission rate, after the serving cell has been changed.

A fifth aspect of the present invention is summarized as a mobile station which transmits user data via an uplink, comprising: an initial maximum allowable transmission rate receiving unit configured to receive an initial maximum allowable transmission rate of the user data notified by a radio network controller, when a serving cell of the mobile station is to be changed; and a transmission rate control unit configured to determine a transmission rate of the user data based on the initial maximum allowable transmission rate notified from the radio network controller, while the serving cell is being changed; and to determine the transmission rate of the user data based on a maximum allowable transmission rate in the changed serving cell of the mobile station, after the serving cell has been changed.

In the fifth aspect of the present invention, the mobile station may comprise a maximum allowable transmission rate receiving unit configured to receive the maximum allowable transmission rate in the changed serving cell of the mobile station signaled by the changed serving cell of the mobile station; and the transmission rate control unit may be configured to determine the transmission rate of the user data based on the received maximum allowable transmission rate.

In the fifth aspect of the present invention, the mobile station may comprise a maximum allowable transmission rate receiving unit configured to receive the maximum allowable transmission rate in the changed serving cell of the mobile station notified by the radio network controller; and the transmission rate control unit may be configured to determine the transmission rate of the user data based on the received maximum allowable transmission rate.

BEST MODE FOR CARRYING OUT THE INVENTION (Configuration of Mobile Communication System According to First Embodiment of the Present Invention)

A description will be given of a configuration of a mobile communication system according to a first embodiment of the present invention with reference to FIGS. 5 to 12.

Figure 1:
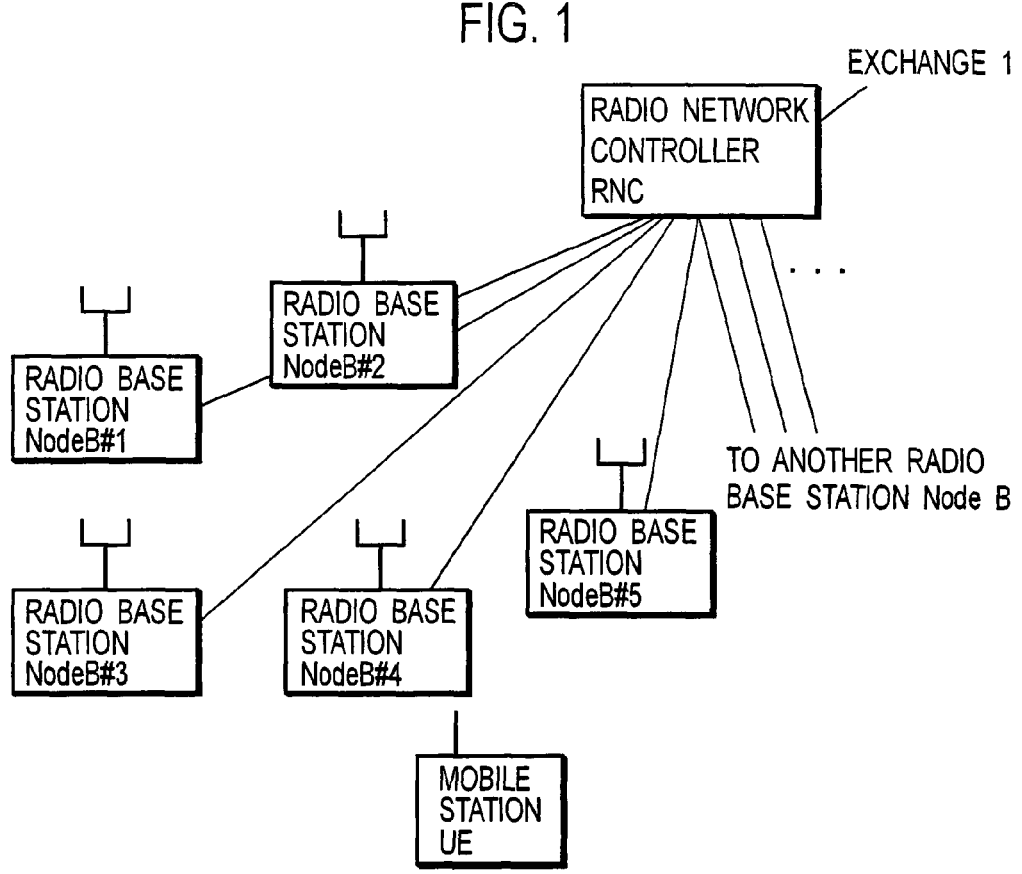
FIG. 1 is a diagram showing an entire configuration of a general mobile communication system.
Figure 2:
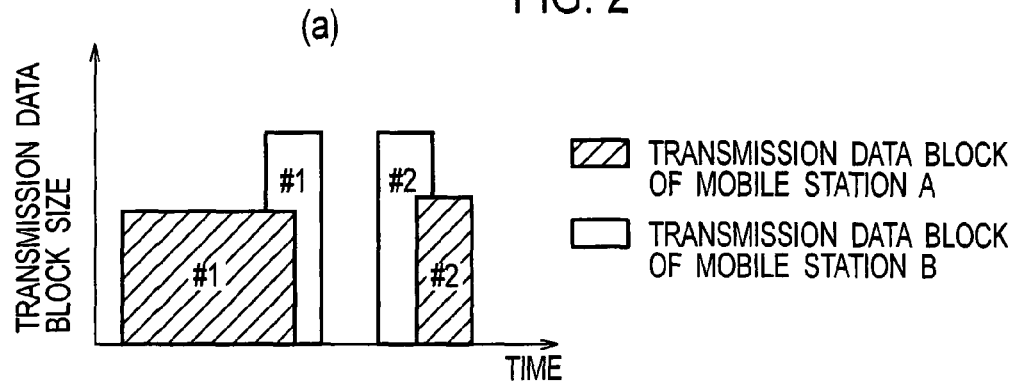
FIGS. 2(a) to 2(c) are graphs illustrating operations at the time of burst data transmission in a conventional mobile communication system.
Figure 2:
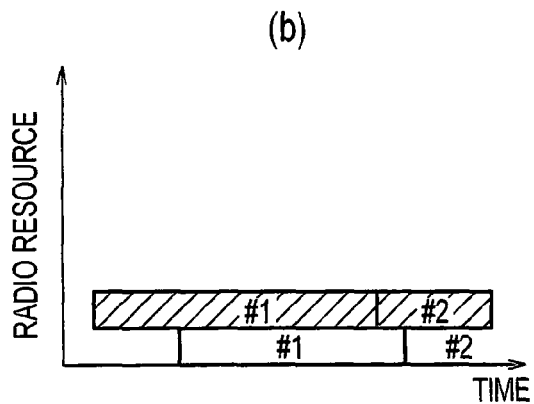
Figure 2:
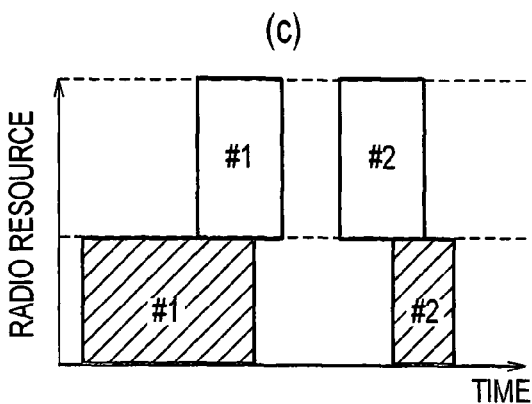

It should be noted that, as shown in FIG. 1, the mobile communication system according to this embodiment is provided with a plurality of radio base stations Node B #1 to Node B #5 and a radio network controller RNC.

The mobile communication system according to the present embodiment is configured to control a transmission rate of user data transmitted via an uplink by a mobile station UE.

In addition, in the mobile communication system according to this embodiment, a "High Speed Downlink Packet Access (HSDPA)" is used in a downlink, and an "Enhanced Uplink (EUL)" is used in an uplink.

It should be noted that in both of the HSDPA and the EUL, retransmission control (N process stop and wait) shall be performed by a "Hybrid Automatic Repeat Request (HARQ)".

Therefore, in an uplink, an "Enhanced Dedicated Physical Channel (E-DPCH)" configured of an "Enhanced Dedicated Physical Data Channel (E-DPDCH)" and an "Enhanced Dedicated Physical Control Channel (E-DPCCH)", and a "Dedicated Physical Channel (DPCH)" configured of a "Dedicated Physical Date Channel (DPDCH)" and a "Dedicated Physical Control Channel (DPCCH)" are used.

Here, the E-DPCCH transmits control data for the EUL such as a transmission format number for defining a transmission format (transmission block size, or the like) of the EDPDCH, HARQ related information (the number of retransmission, or the like), and scheduling related information (transmission power, buffer residence-volume, or the like in the mobile station UE).

In addition, the E-DPDCH is paired with the E-DPCCH, and transmits user data for the mobile station UE based on the control data for the EUL transmitted through the E-DPCCH.

The DPCCH transmits control data such as a pilot symbol that is used for RAKE combining, SIR measurement, or the like, a Transport Format Combination Indicator (TFCI) for identifying a transmission format of uplink DPDCH, and a downlink power control bit in a downlink.

In addition, the DPDCH is paired with the DPCCH, and transmits user data for the mobile station UE based on the control data transmitted through the DPCCH. However, if user data that should be transmitted does not exist in the mobile station UE, the DPDCH can be configured not to be transmitted.

In addition, in the uplink, a "High Speed Dedicated Physical Control Channel (HS-DPCCH)" and a "Random Access Channel (RACH)", which are needed when the HSPDA is applied, are also used.

The HS-DPCCH transmits a Channel Quality Indicator (CQI) in a downlink and an acknowledge signal (Ack or Nack) for the HS-DPCCH.

Figure 5:
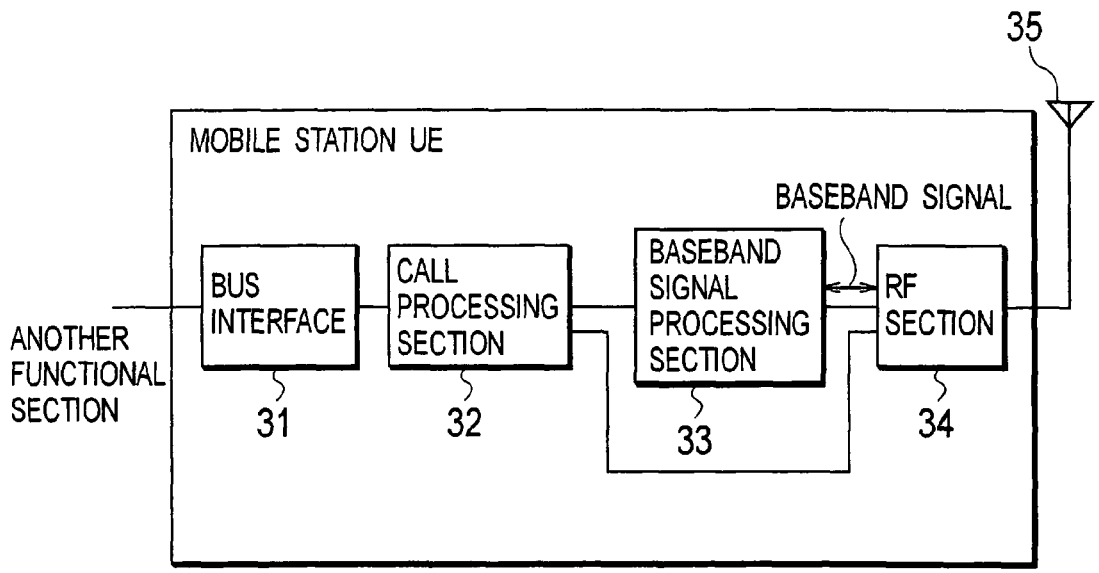
FIG. 5 is a functional block diagram of a mobile station of a mobile communication system according to an embodiment of the present invention.

As shown in FIG. 5, the mobile station UE according to this embodiment is provided with a bus interface 31, a call processing section 32, a baseband processing section 33, a radio frequency (RF) section 34, and a transmission-reception antenna 35.

However, these functions can be independently present as hardware, and can be partly or entirely integrated, or can be configured through a process of software.

The bus interface 31 is configured to forward user data output from the call processing section 32 to another functional section (for example, an application related functional section). In addition, the bus interface 31 is configured to forward user data transmitted from another functional section (for example, the application related functional section) to the call processing section 32.

The call processing section 32 is configured to perform a call control processing for transmitting and receiving user data.

The baseband signal processing section 33 is configured to transmit, to the call processing section 32, the user data acquired by performing, against the baseband signals transmitted from the RF section 34, a Layer 1 processing including a despreading processing, a RAKE combining processing, and an "Forward Error Correction (FEC)" decode processing, a "Media Access Control (MAC)" processing including a MAC-e processing and a MAC-d processing, and a "Radio Link Control (RLC)" processing.

In addition, the baseband signal processing section 33 is configured to generate the baseband signals by performing the RLC processing, the MAC processing, or the layer-1 processing against the user data transmitted from the call processing section 32 so as to transmit the baseband signals to the RF section 34.

Detailed description of the functions of the baseband signal processing section 33 will be given later.

The RF section 34 is configured to generate baseband signals by performing the detection processing, the filtering processing, the quantization processing, or the like against radio frequency signals received through the transmission-reception antenna 35, so as to transmit the generated baseband signals to the baseband signal processing section 33.

In addition, the RF section 34 is configured to convert the baseband signals transmitted from the baseband signal processing section 33 to the radio frequency signals.

Figure 6:
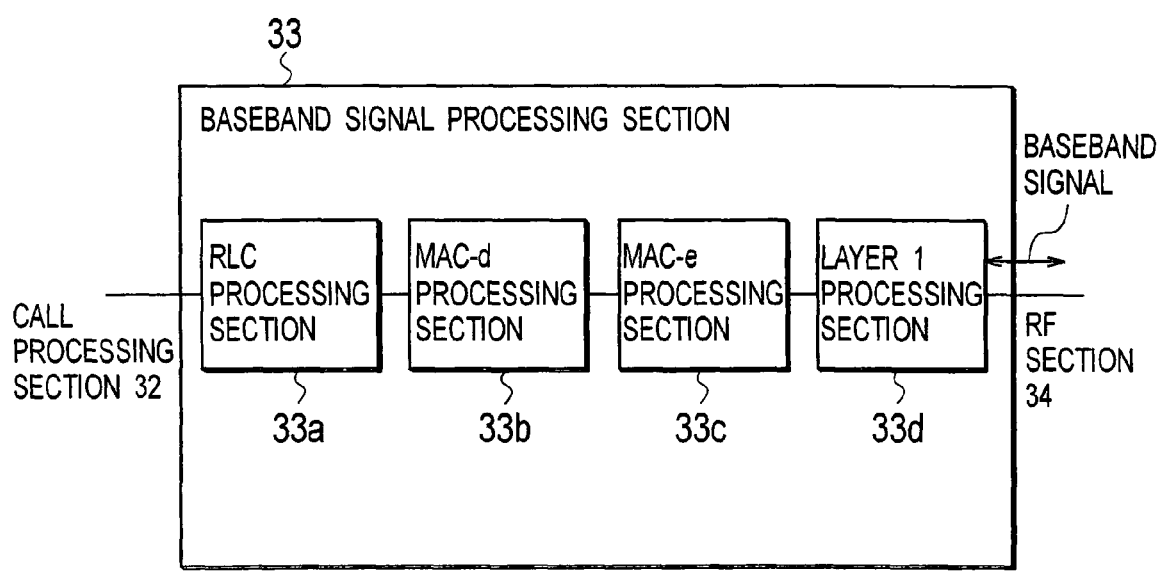
FIG. 6 is a functional block diagram of a baseband signal processing section in a mobile station of the mobile communication system according to the embodiment of the invention.

As shown in FIG. 6, the baseband signal processing section 33 is provided with a RLC processing section 33a, a MAC-d processing section 33b, a MAC-e processing section 33c, and a layer-1 processing section 33d.

The RLC processing section 33a is configured to transmit, to the MAC-d processing section 33b, the user data transmitted from the call processing section 32 by performing a processing (RLC processing) in an upper layer of a layer-2 against the user data.

The MAC-d processing section 33b is configured to grant a channel identifier header, and to create a transmission format in the uplink based on the limitation of transmission power.

Figure 7:
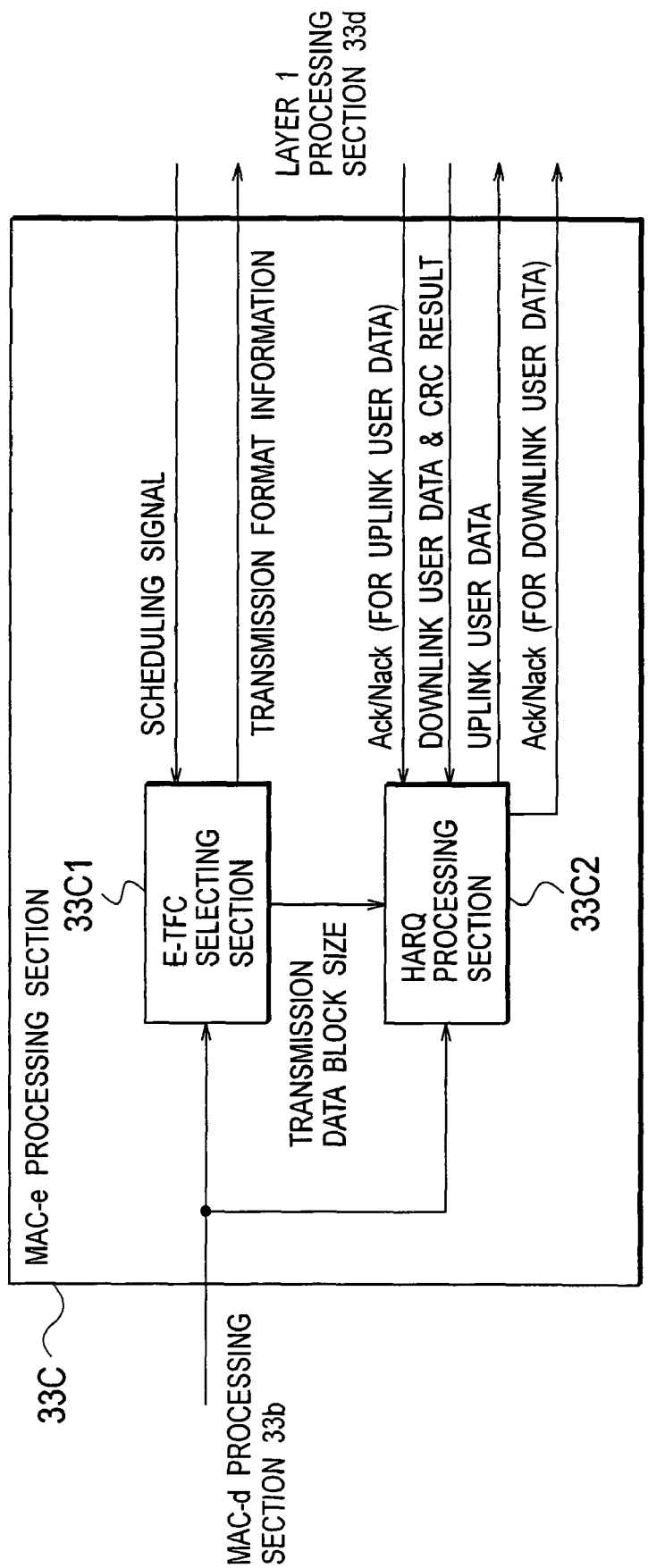
FIG. 7 is a functional block diagram of a MAC-e processing section of the baseband signal processing section in a mobile station of the mobile communication system according to the embodiment of the invention.

As shown in FIG. 7, the MAC-e processing section 33c is provided with an Enhanced Transport Format Combination (E-TFC) selecting section 33c1 and an HARQ processing section 33c2.

The E-TFC selecting section 33c1 is configured to determine a transmission format (E-TFC) of the E-DPDCH and the E-DPCCH, based on scheduling signals transmitted from the radio base station Node B.

In other words, the E-TFC selecting section 33c1 is configured to determine a transmission rate of user data in uplink.

In addition, the E-TFC selecting section 33c1 is configured to transmit transmission format information on the determined transmission format (that is, a transmission data block size, an transmission power ratio between the E-DPDCH and the DPCCH, or the like) to the layer-1 processing section 33d, and also to transmit the determined transmission data block size or transmission power ratio to the HARQ processing section 33c2.

Here, the scheduling signals include the maximum allowable transmission rate of user data in the mobile station UE (for example, a maximum value of the transmission power ratio between the E-DPDCH and the DPCCH (maximum allowable transmission power ratio), or the like), or a parameter related to the maximum allowable transmission rate.

In this description, unless specified otherwise, it is assumed that the maximum allowable transmission rate includes the parameter related to the maximum allowable transmission rate.

Such scheduling signals are information that is signaled in the cell where the mobile station UE is located, and includes control information for all the mobile stations located in the sector, or a specific group of the mobile stations located in the sector.

Here, the E-TFC selecting section 33c1 is configured to increase the transmission rate of user data in the uplink up to the maximum allowable transmission rate notified by the scheduling signals from the radio base station Node B.

Specifically, the E-TFC selecting section 33c1 may be configured to increase the transmission rate of the uplink user data up to the initial maximum allowable transmission rate notified from the radio network controller RNC automatically, while the serving cell is being changed.

More Specifically, the E-TFC selecting section 33c1 is configured to determine the transmission rate of the uplink user data based on the maximum allowable transmission rate notified by the scheduling signals from the radio base station NodeB.

In addition, the E-TFC selecting section 33c1 may be configured to increase the transmission rate of uplink user data up to the maximum allowable transmission rate signaled by the changed serving cell of the mobile station (destination cell) automatically, after the serving cell has been changed.

More specifically, the E-TFC selecting section 33c1 may be configured to determine the transmission rate of uplink user data based on the maximum allowable transmission rate signaled by the changed serving cell of the mobile station UE (destination cell), after the serving cell has been changed.

In addition, the E-TFC selecting section 33c1 may be configured to increase the transmission rate of uplink user data up to the maximum allowable transmission rate notified by the radio network controller RNC automatically, after the serving cell has been changed.

More specifically, the E-TFC selecting section 33c1 may be configured to determine the transmission rate of uplink user data based on the maximum allowable transmission rate notified by the radio network controller RNC, after the serving cell has been changed.

The HARQ processing section 33c2 is configured to perform process control for the "stop-and-wait of N-process", so as to transmit the user data in the uplink based on an acknowledge signal (Ack/Nack for uplink data) transmitted from the radio base station Node B.

Specifically, the HARQ processing section 33c2 is configured to determine whether or not the receive processing of downlink user data has been successful based on the result of the "Cyclic Redundancy Check (CRC)" entered from the first layer processing section 33d.

Then, the HARQ processing section 33c2 is configured to generate an acknowledge signal (Ack/Nack for downlink user data) based on the determined result, so as to transmit the acknowledge signal to the layer-1 processing section 33d.

In addition, the HARQ processing section 33c2 is configured to transmit, to the MAC-d processing 33d, the downlink user data entered from the layer-1 processing section 33d when the above-described determination result has been successful.

Figure 8:
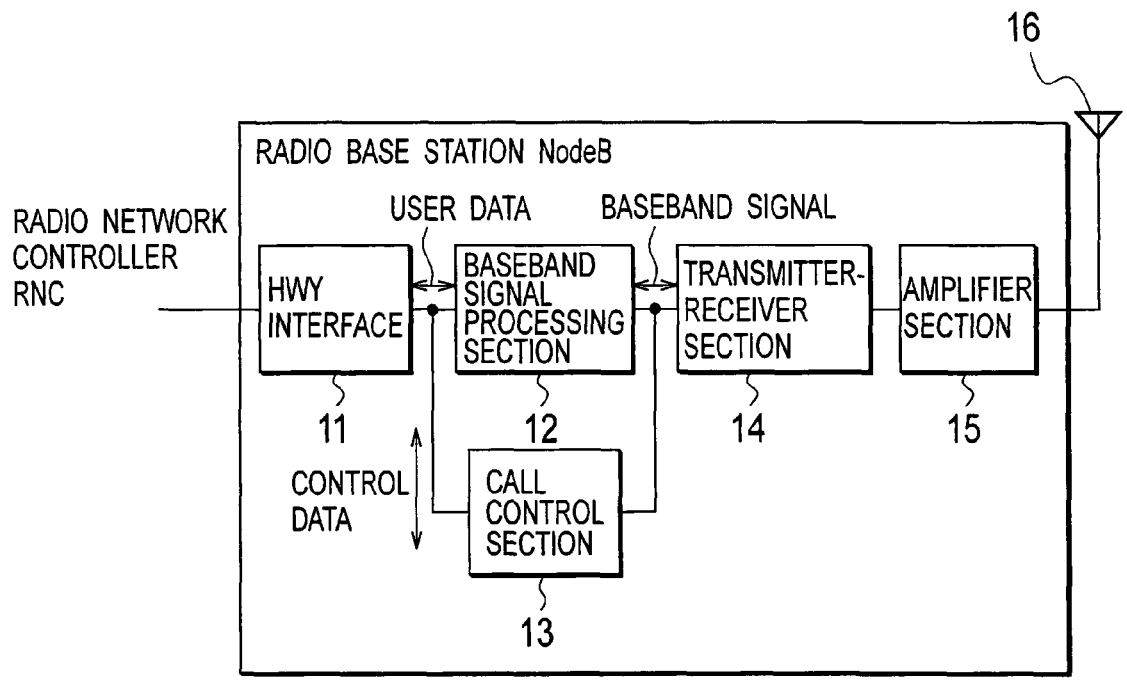
FIG. 8 is a functional block diagram of a radio base station of the mobile communication system according to the embodiment of the invention.

As shown in FIG. 8, the radio base station Node B according to this embodiment is provided with an HWY interface 11, a baseband signal processing section 12, a call control section 13, at least one transmitter-receiver section 14, at least one amplifier section 15, and at least one transmission - reception antenna 16.

The HVY interface 11 is an interface for a radio network controller RNC. Specifically, the HWY interface 11 is configured to receive user data transmitted from the radio network controller RNC to a mobile station UE via a downlink, so as to enter the user data to the baseband signal processing section 12.

In addition, the HWY interface 11 is configured to receive control data for the radio base station Node B from the radio network controller RNC, so as to enter the received control data to the call control section 13.

In addition, the HWY interface 11 is configured to acquire, from the baseband signal processing section 12, the user data included in the uplink signals which are transmitted from a mobile station UE via an uplink, so as to transmit the acquired user data to the radio network controller RNC.

Further, the HWY interface 11 is configured to acquire the control data for the radio network controller RNC from the call control section 13, so as to transmit the acquired control data to the radio network controller RNC.

The baseband signal processing section 12 is configured to generate baseband signals by performing the RLC processing, the MAC processing (the MAC-d processing and the MAC-e processing), or the layer-1 processing against the user data acquired from the HWY interface 11, so as to forward the generated baseband signals to the transmitter-receiver section 14.

Here, the MAC processing in the downlink includes an HARQ processing, a scheduling processing, a transmission rate control processing, or the like.

In addition, the layer-1 processing includes a channel coding processing of user data, a spreading processing, or the like.

In addition, the baseband signal processing section 12 is configured to extract user data by performing the layer-1 processing, the MAC processing (the MAC-e processing and the MAC-d processing), or the RLC processing against the baseband signals acquired from the transmitter-receiver section 14, so as to forward the extracted user data to the HWY interface 11.

Here, the MAC processing in the uplink includes the HARQ processing, the scheduling processing, the transmission rate control processing, a header disposal processing, or the like.

In addition, the layer-1 processing in the uplink includes the despreading processing, the RAKE combining processing, the error correction decode processing, or the like.

Detailed description of the functions of the baseband signal processing section 12 will be given later.

In addition, the call control section 13 is configured to perform the call control processing, based on the control data acquired from the HWY interface 11.

The transmitter-receiver section 14 is configured to perform processing of converting baseband signals, which are acquired from the baseband signal processing section 12, to radio frequency signals (downlink signals), so as to transmit the converted radio frequency signals to the amplifier section 15.

In addition, the transmitter-receiver 14 is configured to perform processing of converting the radio frequency signals (uplink signals), which are acquired from the amplifier section 15, to the baseband signals, so as to transmit the converted baseband signals to the baseband signal processing section 12.

The amplifier section 15 is configured to amplify the downlink signals acquired from the transmitter-receiver section 14, so as to transmit the amplified downlink signals to the mobile station UE via the transmission-reception antenna 16.

In addition, the amplifier 15 is configured to amplify the uplink signals received by the transmission - reception antenna 16, so as to transmit the amplified uplink signals to the transmitter-receiver section 14.

Figure 9:
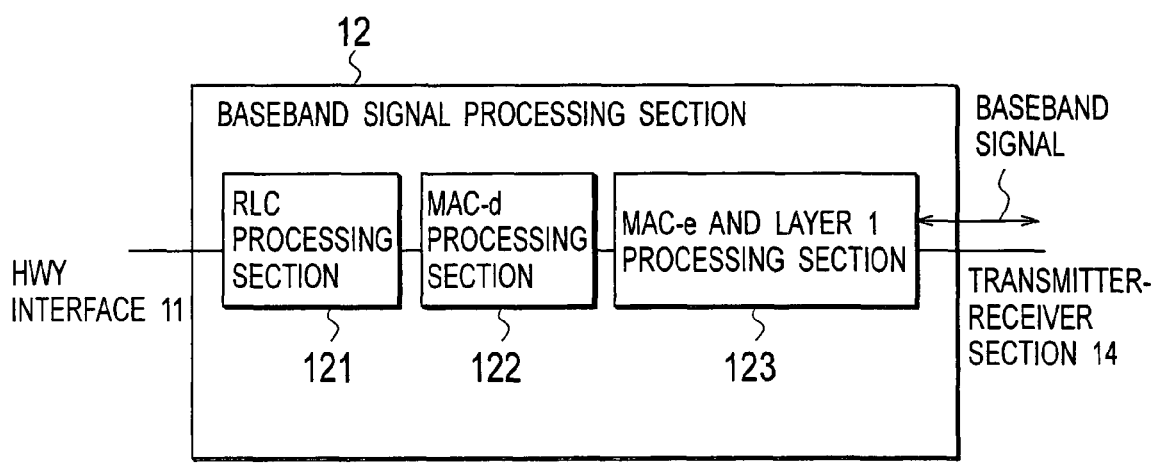
FIG. 9 is a functional block diagram of a baseband signal processing section in a radio base station of the mobile communication system according to an embodiment of the invention.

As shown in FIG. 9, the baseband signal processing section 12 is provided with a RLC processing section 121, a MAC-d processing section 122, and a MAC-e and first layer processing section 123.

The MAC-e and layer-1 processing section 123 is configured to perform, against the baseband signals acquired from the transmitter-receiver section 14, the despreading processing, the RAKE combining processing, the error correction decode processing, the HARQ processing, or the like.

The MAC-d processing section 122 is configured to perform a disposal processing of header against output signals from the MAC-e and layer-1 processing section 123.

The RLC processing section 121 is configured to perform, against the output signals from the MAC-d processing section 122, the retransmission control processing in the RLC layer or the reestablishment processing of RLC-Service Data Section (SDU).

However, these functions are not clearly divided per hardware, and can be obtained by software.

Figure 10:
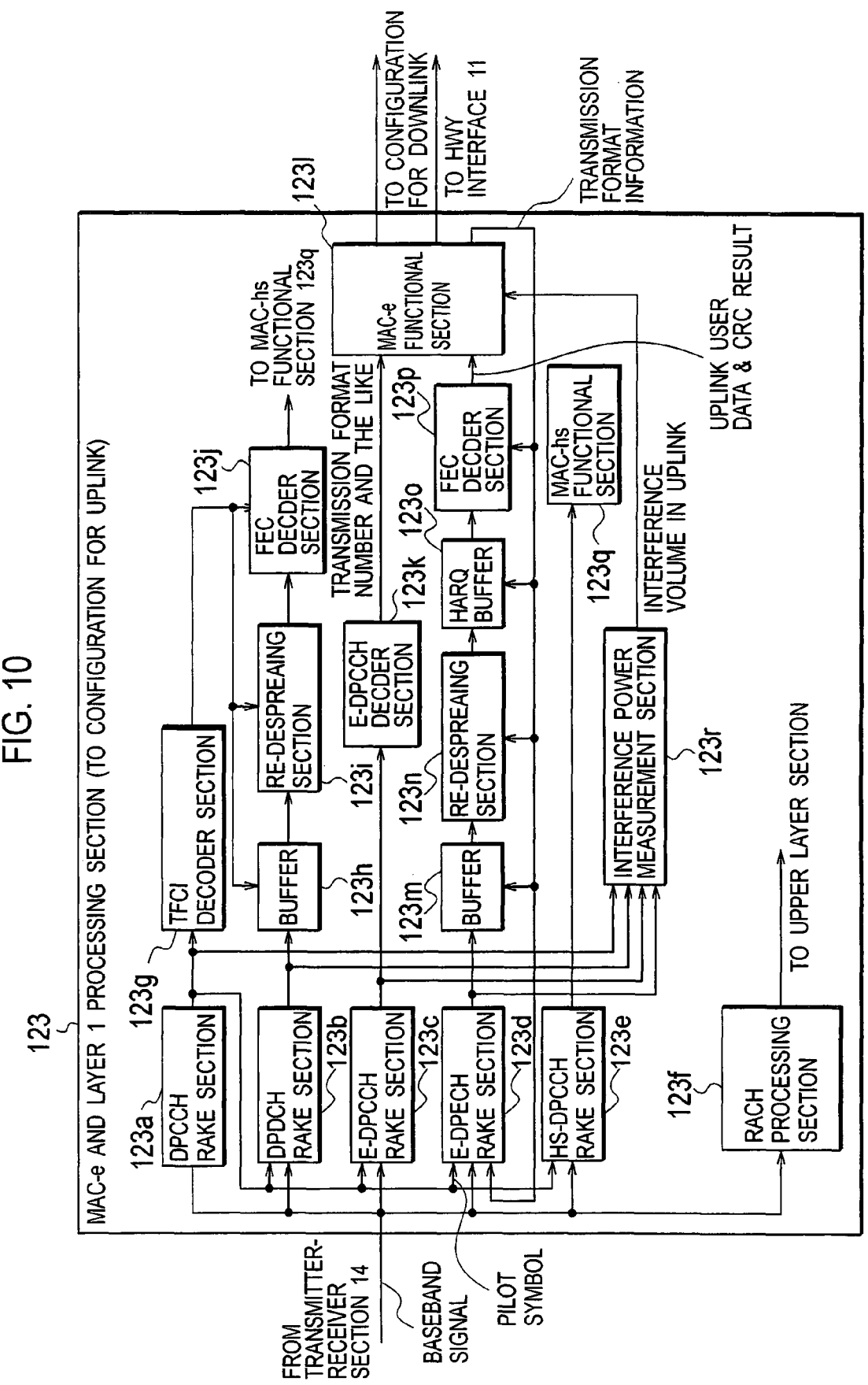
FIG. 10 is a functional block diagram of a MAC-e and Layer 1 processing section (configuration for uplink) of the baseband signal processing section of a radio base station of the mobile communication system according to the embodiment of the invention.

As shown in FIG. 10, the MAC-e and layer-1 processing section (configuration for the uplink) 123 is provided with a DPCCH RAKE section 123a, a DPDCH RAKE section 123b, an E-DPCCH RAKE section 123c, an E-DPDCH RAKE section 123d, an HS-DPCCH RAKE section 123e, a RACH processing section 123f, a Transport Format Combination Indicator (TFCI) decoder section 123g, buffers 123h and 123m, re-despreading sections 123i and 123n, FEC decoder sections 123j and 123p, an E-DPCCH decoder section 123k, a MAC-e functional section 123l, an HARQ buffer 123o, a MAC-hs functional section 123q, and an interference power measurement section 123r.

The E-DPCCH RAKE section 123c is configured to perform, against the E-DPCCH in the baseband signals transmitted from the transmitter-receiver section 14, the despreading processing and the RAKE combining processing using a pilot symbol included in the DPCCH.

The E-DPCCH decoder section 123k is configured to acquire transmission format number related information, HARQ related information, scheduling related information, or the like, by performing the decode processing against the RAKE combining outputs of the E-DPCCH RAKE section 123c, so as to enter the information to the MAC-e functional section 123l.

The E-DPDCH RAKE section 123d is configured to perform, against the E-DPDCH in the baseband signals transmitted from the transmitter-receiver section 14, the despreading processing using the transmission format information (the number of codes) transmitted from the MAC-e functional section 123l and the RAKE combining processing using the pilot symbol included in the DPCCH.

The buffer 123m is configured to store the RAKE combining outputs of the E-DPDCH RAKE section 123d based on the transmission format information (the number of symbols) transmitted from the MAC-e functional section 123l.

The re-despreading section 123n is configured to perform the despreading processing against the RAKE combining outputs of the E-DPDCH RAKE section 123m, based on the transmission format information (spreading factor) transmitted from the MAC-e functional section 123l.

The HARQ buffer 123o is configured to store the despreading processing outputs of the re-despreading section 123n, based on the transmission format information transmitted from the MAC-e functional section 123l.

The FEC decoder section 123p is configured to perform an error correction decoding processing (the FEC decoding processing) against the despreading processing outputs of the re-despreading section 123n, which is stored in the HARQ buffer 123o, based on the transmission format information (transmission data block size) transmitted from the MAC-e functional section 123l.

The interference power measurement section 123r is configured to measure an interference volume (noise rise) in the uplink such as interference power by a mobile station UE whose cell serves as a servicing cell, and the entire interference power.

Here, the noise rise is a ratio between the interference power in a predetermined channel within a predetermined frequency and noise power (thermal noise power or noise power from the outside of the mobile communication system) within the predetermined frequency (i.e., a receiving level from a noise floor).

In other words, the noise rise is a received interference power offset that a receiving level in communication has against a receiving level (noise floor) in non-communication.

The MAC-e functional section 123l is configured to calculate and output the transmission format information (the number of codes, the number of symbols, spreading factor, transmission data block size, and the like) based on the transmission format number related information, the HARQ related information, the scheduling related information, and the like, which are acquired from the E-DPCCH decoder section 123k.

Figure 11:
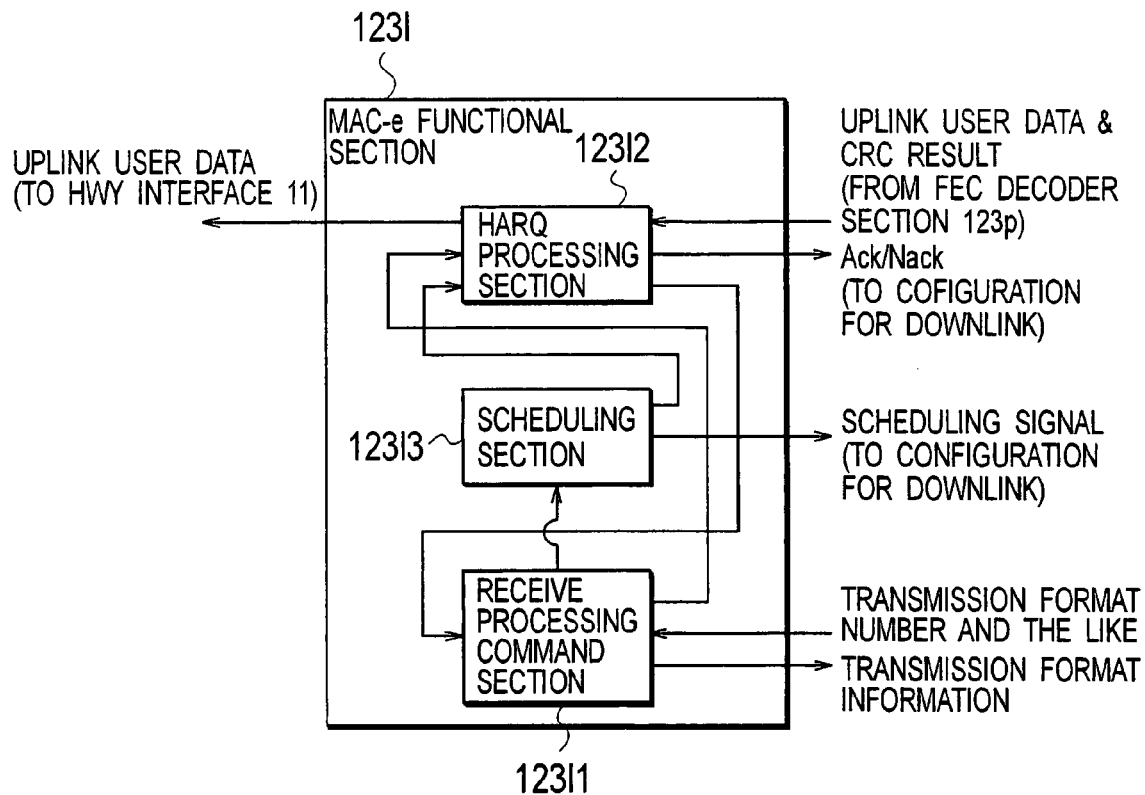
FIG. 11 is a functional block diagram of a MAC-e functional section of the MAC-e and Layer 1 processing section (configuration for uplink) in the baseband signal processing section in a radio base station of the mobile communication system according to the embodiment of the present invention.

In addition, as shown in FIG. 11, the MAC-e functional section 123l is provided with a receive processing command section 123l/1, an HARQ processing section 123l/2, and a scheduling section 123l/3.

The receive processing command section 123l/1 is configured to transmit the transmission format number related information, the HARQ related information, and the scheduling related information, which are entered from the E-DPCCH decoder section 123, to the HARQ processing section 123l/2.

In addition, the receive processing command section 123l/1 is configured to transmit, to the scheduling section 123l/3, the scheduling related information entered from the E-DPCCH decoder 123k.

Further, the receive processing command section 123l/1 is configured to output the transmission format information corresponding to the transmission format number entered from the E-DPCCH decoder section 123k.

The HARQ processing section 123l/2 is configured to determine whether or not the receive processing of uplink user data has been successful, based on the CRC result entered from the FEC decoder section 123p.

Then, the HARQ processing section 123l/2 is configured to generate an acknowledge signal (Ack or Nack), based on the determination result, so as to transmit the generated acknowledge signal to the configuration for the downlink of the baseband signal processing section 12.

In addition, the HARQ processing section 123l/2 is configured to transmit the uplink user data entered from the FEC decoder section 123p to the radio network controller RNC, when the above determination result has been successful.

In addition, the HARQ processing section 123l/2 is configured to clear soft decision values stored in the HARQ buffer 123o, when the above determination result has been successful.

On the other hand, the HARQ processing section 123l/2 is configured to store, in the HARQ buffer 123o, the uplink user data, when the above determination result has not been successful.

In addition, the HARQ processing section 123l/2 is configured to forward the above determination result to the receive processing command section 123l/1.

The receive processing control command section 123l/1 is configured to notify the E-DPDCH RAKE section 123d and the buffer 123m of an hardware resource that should be prepared for the following transmission time interval (TTI), so as to perform notification for reserving the resource in the HARQ buffer 123o.

In addition, when the uplink user data is stored in the buffer 123m, the receive processing command section 123l/1 is configured to instruct the HARQ buffer 123o and the FEC decoder section 123p to perform the FEC decoding processing after adding the uplink user data, which is stored in the HARQ buffer 123o, in a process corresponding to the TTI and a newly received uplink user data, per TTI.

In addition, the scheduling section 123l/3 is configured to instruct the configuration for the downlink of the baseband signal processing section 12 to transmit the scheduling signals including the maximum allowable transmission rate (maximum allowable transmission data block size, maximum allowable transmission power ratio, or the like), based on radio resources in the uplink of the radio base station Node B, interference volume (noise rise) in the uplink, or the like.

Specifically, the scheduling section 123l/3 is configured to determine the maximum allowable transmission rate based on the scheduling related information (radio resources in the uplink) transmitted from the E-DPCCH decoder section 123k or the interference volume in the uplink transmitted from the interference power measurement section 123r, so as to control the transmission rate of user data in a communicating mobile station in communication.

Detailed descriptions of a control method based on the hardware resources and a control method based on the interference volume in the uplink will be given below.

In the control method based on the hardware resources, the scheduling section 123l/3 is configured to signal the maximum allowable transmission rate through the AGCH to the mobile station UE connected to a cell under the control of the radio base station Node B.

When the transmission rate of user data in the mobile station UE connected to the cell under the control of the radio base station Node B increases and the hardware resources becomes insufficient, the scheduling section 123l/3 lowers the maximum allowable transmission rate so that shortage of the hardware resources will not be caused.

On the other hand, when the hardware resources have spaces in such a case when the user data transmission in the mobile station UE connected to the cell under the control of the radio base station Node B is completed, or the like, the scheduling section 123l/3 again increases the maximum allowable transmission rate.

In addition, in the control method based on the interference volume in the uplink, the scheduling section 123l/3 is configured to signal the maximum allowable transmission rate through the AGCH to the mobile station UE connected to the sector under the control of the radio base station Node B.

Figure 3:
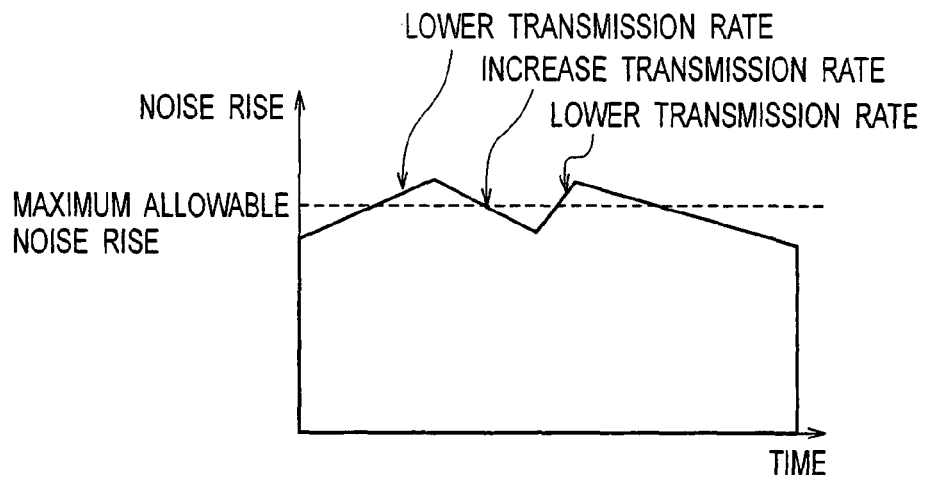
FIG. 3 is a graph illustrating operations at the time of controlling transmission rate in an uplink in the conventional mobile communication system.
Figure 4:
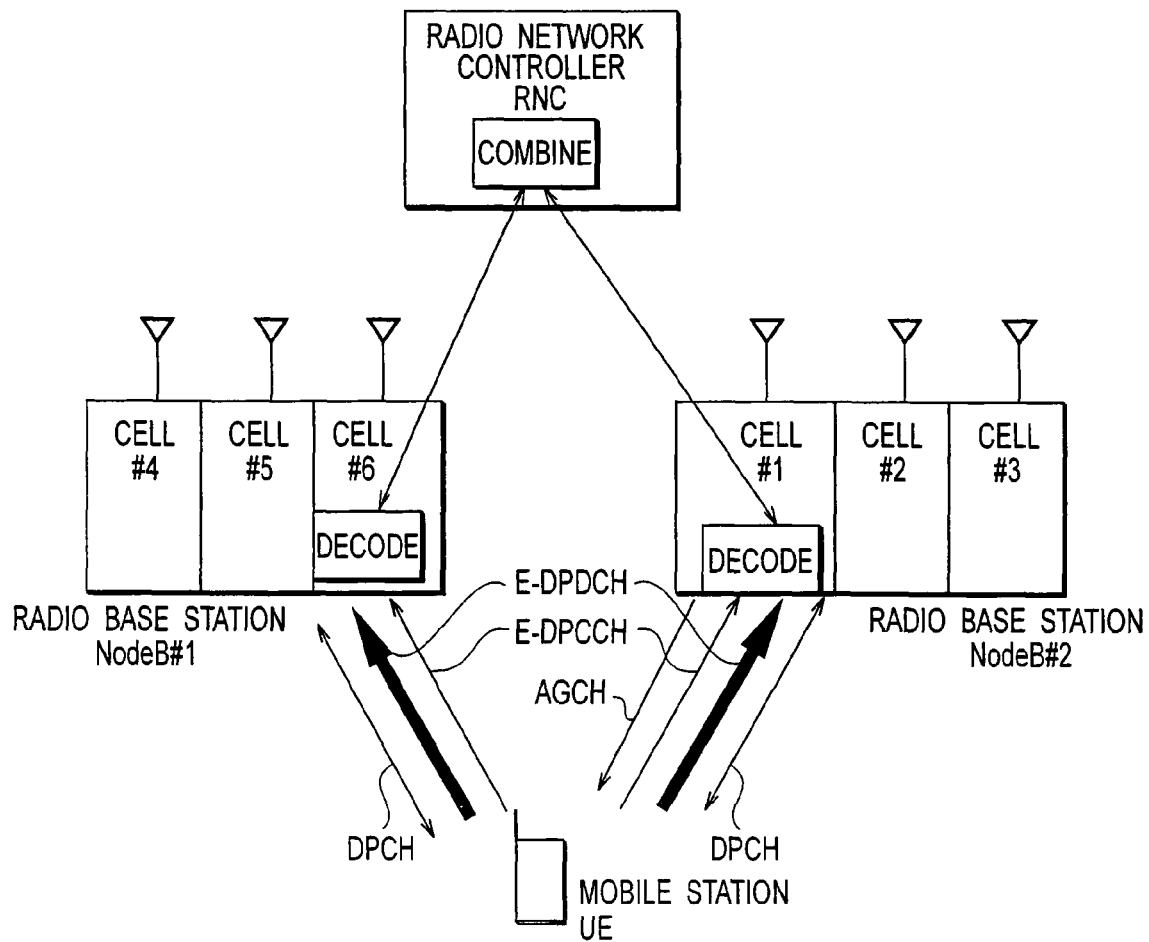
FIG. 4 is a diagram showing a channel connection configuration in a mobile communication system to which conventional enhanced uplink is applied.

When the transmission rate of user data in the mobile station UE connected to the cell under the control of the radio base station Node B increases and the interference volume (for example, noise rise) in the uplink exceeds an allowable value (for example, maximum allowable noise rise), the scheduling section 123l/3 lowers the maximum allowable transmission rate so that the interference volume in the uplink can fall within a range of the allowable value (see, FIG. 3).

On the other hand, when the interference volume (for example, noise rise) in the uplink falls within the range of the allowable value (for example, maximum allowable noise rise) and there is a space therein in the case when the user data transmission in the mobile station UE connected to the cell under the control of the radio base station Node B is completed, or the like, the scheduling section 123l/3 again increases the maximum allowable transmission rate (see, FIG. 3).

The radio network controller RNC according to this embodiment is an apparatus located in an upper level of the radio base station Node B, and is configured to control radio communications between the radio base station Node B and the mobile station UE.

Figure 12:
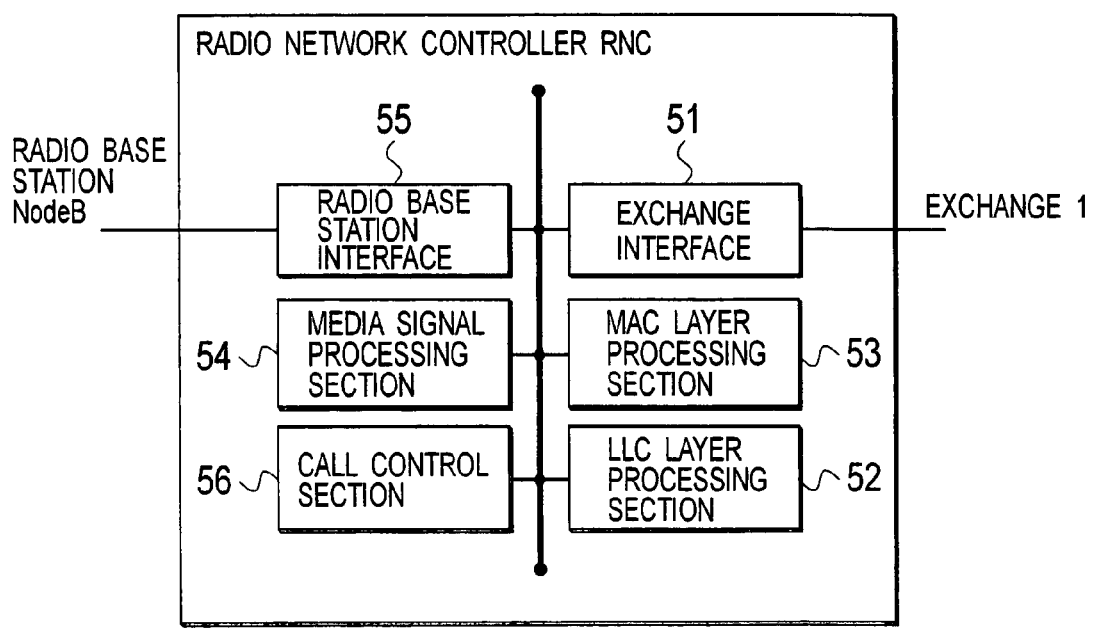
FIG. 12 is a functional block diagram of a radio network controller of the mobile communication system according to the embodiment of the present invention.

As shown in FIG. 12, the radio network controller RNC according to this embodiment is provided with an exchange interface 51, a Logical Link Control (LLC) layer processing section 52, a MAC layer processing section 53, a media signal processing section 54, a radio base station interface 55, and a call control section 56.

The exchange interface 51 is an interface with an exchange 1, and is configured to forward the downlink signals transmitted from the exchange 1 to the LLC layer processing section 52, and to forward the uplink signals transmitted from the LLC layer processing section 52 to the exchange 1.

The LLC layer processing section 52 is configured to perform an LLC sub-layer processing such as a synthesis processing of a header such as a sequence number or a trailer.

The LLC layer processing section 52 is also configured to transmit the uplink signals to the exchange interface 51 and to transmit the downlink signals to the MAC layer processing section 53, after the LLC sub-layer processing is performed.

The MAC layer processing section 53 is configured to perform a MAC layer processing such as a priority control processing or a header granting processing.

The MAC layer processing section 53 is also configured to transmit the uplink signals to the LLC layer processing section 52 and to transmit the downlink signals to the radio base station interface 55 (or a media signal processing section 54), after the MAC layer processing is performed.

The media signal processing section 54 is configured to perform a media signal processing against voice signals or real time image signals.

The media signal processing section 54 is also configured to transmit the uplink signals to the MAC layer processing section 53 and to transmit the downlink signals to the radio base station interface 55, after the media signal processing is performed.

The radio base station interface 55 is an interface with the radio base station Node B. The radio base station interface 55 is configured to forward the uplink signals transmitted from the radio base station Node B to the MAC layer processing section 53 (or the media signal processing section 54) and to forward the downlink signals transmitted from the MAC layer processing section 53 (or the media signal processing section 54) to the radio base station Node B.

The call control section 56 is configured to perform a radio resource control processing, a channel setup and open processing by the layer-3 signaling, or the like.

Here, the radio resource control processing includes a call admission control processing, a handover processing, or the like.

Specifically, the call control section 56 is configured to determine whether or not cell change is performed based on the measurement report from the mobile station UE, the measurement report from the radio base station NodeB or the like.

In addition, the call control section 56 is configured to notify an initial maximum allowable transmission rate of the user data to the mobile station UE which performs the cell change, based on the allocation state of resources in the destination cell in the cell change, throughput in the uplink user data or the like, when a serving cell of the mobile station is to be changed.

In addition, the call control section 56 may be configured to notify a maximum allowable transmission rate of the user data to the mobile station UE by including the maximum allowable transmission rate of the destination cell in the cell change in a message indicating that the cell change is completed (a layer 3 message), after the cell change has been completed.

(Operation of Mobile Communication System According to First Embodiment of the Present Invention)

Figure 13:
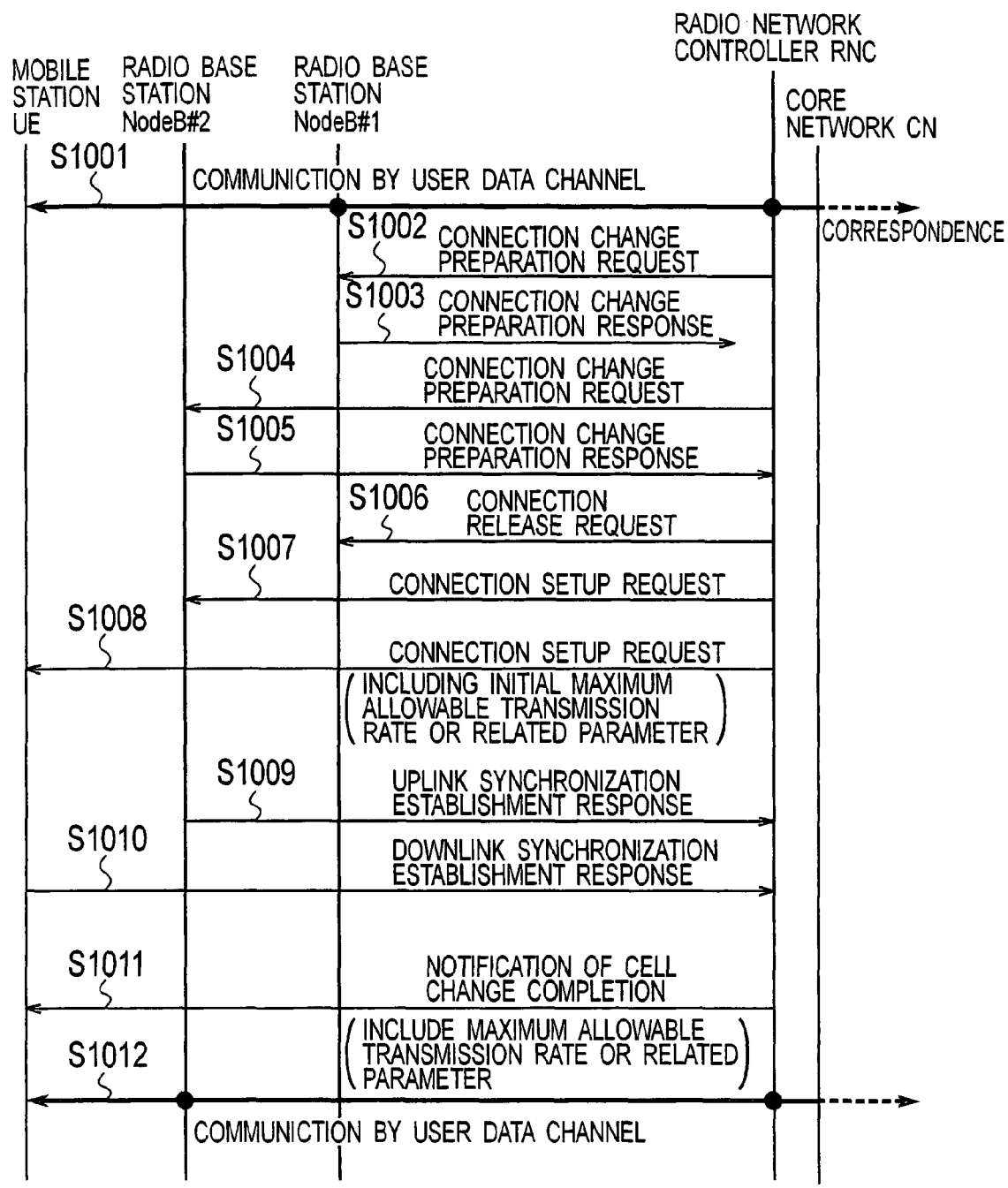
FIG. 13 is a sequence diagram showing an operation of the mobile communication system according to an embodiment of the present invention.

Referring to FIG. 13, an operation of the mobile communication system according to the first embodiment of the present invention is described below. FIG. 13 shows a cell change in a case where a serving cell of the mobile station UE is changed from a cell under a radio base station NodeB#1 to a cell under a radio base station NodeB#2.

As shown in FIG. 13, in step S1001, the mobile station UE is connected to the radio base station NodeB#1 to perform a communication by a user data channel.

In step S1002, when a radio network controller RNC determines to start the cell change, the radio network controller RNC transmits, to the radio base station NodeB#1, a connection change preparation request instructing to make preparations for changing a serving cell of the mobile station UE.

In step S1003, the radio base station NodeB#1 makes the preparation corresponding to the connection change preparation request, and transmits, to the radio network controller RNC, a connection change preparation response notifying that the preparations are completed.

In step S1004, the radio network controller RNC transmits, to the radio base station NodeB#2, a connection change preparation request instructing to make preparations for changing the serving cell of the mobile station UE.

In step S1005, the radio base station NodeB#2 makes preparation corresponding to the connection change preparation request, and transmits, to the radio network controller RNC, a connection change preparation response notifying that the preparations are completed.

In step S1006, the radio network controller RNC transmits, to the radio base station NodeB#1, a connection release request for releasing the connection between the mobile station UE and the radio base station NodeB#1.

In steps S1007 and S1008, the radio network controller RNC transmits, to the radio base station NodeB#2 and the mobile station UE, a connection setup request for setting the connection between the mobile station UE and the radio base station NodeB#2.

Here, the radio network controller RNC reports the initial maximum allowable transmission rate of uplink user data to the mobile station UE with using the connection setup request.

In step S1009, the radio network controller RNC receives an uplink synchronization establishment response from the radio base station NodeB#2 including the destination serving cell in the cell change.

In step S1010, the radio network controller RNC receives a downlink synchronization establishment response from the mobile station UE which performs the cell change.

In step S1011, the radio network controller RNC notifies the mobile station UE of the maximum allowable transmission rate of the uplink user data signaled by the destination serving cell in the cell change with using the completion message (layer 3 message) for notifying that the cell change is completed.

In step S1012, a communication by the user data channel set between the mobile station UE and the radio base station NodeB#2 is started. Thereafter, until the mobile station UE receives the maximum allowable transmission rate of the new uplink user data from the destination serving cell via the absolute grant allocation channel, the mobile station UE automatically increases the transmission rate of the uplink user data up to the notified maximum allowable transmission rate of the uplink user data.

(Effect and Advantage of Mobile Communication System According to First Embodiment of the Present Invention)

According to the mobile communication system in the case of the first embodiment of the present invention, even when the cell change is performed, the significant deterioration in communication quality attributable to the shortage of resource allocation in the destination cell can be prevented.

INDUSTRIAL APPLICABILITY

As described above, the present invention can provide a transmission rate control method, a mobile station and a radio network controller which can prevent significant deterioration in communication quality attributable to the shortage of resource allocation in a destination cell, even when cell change is performed.

The invention claimed is:

1. A transmission rate control method for controlling a transmission rate of user data to be transmitted via an uplink by a mobile station, the method comprising the steps of:
    notifying, at a radio network controller, an initial maximum allowable transmission rate of the user data to the mobile station, when a serving cell of the mobile station is to be changed;
    determining, at the mobile station, the transmission rate of the user data based on the initial maximum allowable transmission rate notified from the radio network controller; and
    determining, at the mobile station, the transmission rate of the user data based on a maximum allowable transmission rate notified from the changed serving cell of the mobile station, after the maximum allowable transmission rate is received at the mobile station.

2. The transmission rate control method according to claim 1, comprising the step of signaling, at the changed serving cell of the mobile station, the maximum allowable transmission rate in the changed serving cell of the mobile station to the mobile station; and wherein
    the mobile station determines the transmission rate of the user data based on the signaled maximum allowable transmission rate, after the maximum allowable transmission rate is signaled to the mobile station.

3. The transmission rate control method according to claim 1, comprising the step of notifying, at the radio network controller, the maximum allowable transmission rate in the changed serving cell of the mobile station to the mobile station, with using a layer-3 message; and wherein
    the mobile station determines the transmission rate of the user data based on the notified maximum allowable transmission rate, after the maximum allowable transmission rate is notified to the mobile station.

4. A mobile station which transmits user data via an uplink, comprising:
    an initial maximum allowable transmission rate receiving unit configured to receive an initial maximum allowable transmission rate of the user data notified by a radio network controller, when a serving cell of the mobile station is to be changed; and
    a transmission rate control unit configured to determine a transmission rate of the user data based on the initial maximum allowable transmission rate notified from the radio network controller, and to determine the transmission rate of the user data based on a maximum allowable transmission rate notified from the changed serving cell of the mobile station, after the maximum allowable transmission rate is received.

5. The mobile station according to claim 4, comprising a maximum allowable transmission rate receiving unit configured to receive the maximum allowable transmission rate in the changed serving cell of the mobile station signaled by the changed serving cell of the mobile station; and wherein
    the transmission rate control unit is configured to determine the transmission rate of the user data based on the received maximum allowable transmission rate.

6. The mobile station according to claim 4, comprising a maximum allowable transmission rate receiving unit configured to receive the maximum allowable transmission rate in the changed serving cell of the mobile station notified by the radio network controller; and wherein
    the transmission rate control unit is configured to determine the transmission rate of the user data based on the received maximum allowable transmission rate.

* * * * *